United States Patent [19]
Bedard

[11] Patent Number: 5,805,235
[45] Date of Patent: Sep. 8, 1998

[54] BOOKMARKING TELEVISION PROGRAM AND CHANNEL SELECTIONS

[75] Inventor: Karen Bedard, San Jose, Calif.

[73] Assignee: Hyundai Electronics America, San Jose, Calif.

[21] Appl. No.: 630,428

[22] Filed: Apr. 3, 1996

[51] Int. Cl.$^6$ .................................................. H04N 5/445
[52] U.S. Cl. .......................... 348/569; 348/906; 348/564
[58] Field of Search ..................... 348/563, 564, 348/569, 589, 600, 601, 906; H04N 5/445, 5/50, 9/74, 9/76

[56] References Cited

U.S. PATENT DOCUMENTS

| 5,528,304 | 6/1996 | Cherrick | 348/565 |
| 5,532,753 | 7/1996 | Buchner | 348/569 |
| 5,596,373 | 1/1997 | White | 348/569 |
| 5,604,544 | 2/1997 | Bertram | 348/601 |

Primary Examiner—Sherrie Hsia
Attorney, Agent, or Firm—Townsend and Townsend and Crew LLP

[57] ABSTRACT

The present invention provides for a method and apparatus which is coupled to broadcast signals, such as television signals, and a television set for displaying broadcast programs and channels. The apparatus displays broadcast programs on selected channels to a viewer, marks one or more of the programs in response to a first signal from the viewer, marks one or more of the channels in response to a second signal from the viewer, stores signals corresponding to the marked programs and channels; and sequentially displays the marked programs and channels in response to a third signal from the viewer. To aid the viewer, the present invention also provides for a method and apparatus for displaying broadcast information, such as television signals, on a television. The apparatus displays a plurality of icons on the screen, sequentially moves an icon cursor from one icon to another icon in response to a first signal from a television viewer to point to one icon at a time, and displays text associated with the pointed icon only.

11 Claims, 8 Drawing Sheets

BOOKMARKING TELEVISION PROGRAM AND CHANNEL SELECTIONS

EXAMPLE FIGURES

The present application includes drawings showing iconographic and electronic program guide information displays on a television screen in accordance with the invention. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates to the selection of broadcast signals and, more particularly, to the convenient selection of broadcast signals, such as television programs and channels, by a viewer.

Since the inception of television, the number of available channels has steadily increased. The inauguration of the UHF band for broadcast use, the development of the cable television infrastructure, and the introduction of readily available direct satellite reception have all increased the number of available channels and programs. Presently there are predictions that there will be hundreds of channels (and a corresponding increase in the number of programs) for individual markets in the United States by the end of this century. These broadcast signals may be television signals, or some other form of broadcast medium.

The proliferation of these channels and programs brings with it a greater variety of choices. However, the viewer's task is complicated by not only learning what programming is available at any particular time and on its channel, but also of simply finding a program to watch. Many television viewers turn on a television set and flip through the channels to find a program which catches their interest. With ten channels, for example, the time to flip through the channels is short. However, with hundreds of available programs, the time required to view all the channels becomes undesirably long. Unless the viewer knows exactly what channel he or she wishes to see, channel flipping becomes the television entertainment itself.

SUMMARY OF THE INVENTION

The present invention overcomes or substantially mitigates some of these problems by providing for an apparatus which is coupled to broadcast signals, such as television signals, and a television set for displaying broadcast programs and channels on a screen of the television set and for a method of displaying broadcast signals, such as programs and channels, on a screen of the television set. The apparatus has means for displaying broadcast programs on selected channels to a viewer, means for marking one or more of the programs in response to a first signal from the viewer, means for marking one or more of the channels in response to a second signal from the viewer, means for storing signals corresponding to the marked programs and channels, and means for sequentially displaying the marked programs and channels in response to a third signal from the viewer.

The present invention also provides for an apparatus and a method for displaying broadcast information, such as television signals, on a screen of a television. The apparatus has means for displaying a plurality of icons on the screen; means for sequentially moving an icon cursor from one icon to another icon in response to a first signal from a television viewer to point to one icon at a time; and means for displaying text associated with the pointed icon only.

BRIEF DESCRIPTION OF THE DRAWINGS

The invention may be better understood by reference to the following detailed description in connection with the accompanying drawings.

DETAILED DESCRIPTION OF SPECIFIC EMBODIMENTS

Figure 1A:
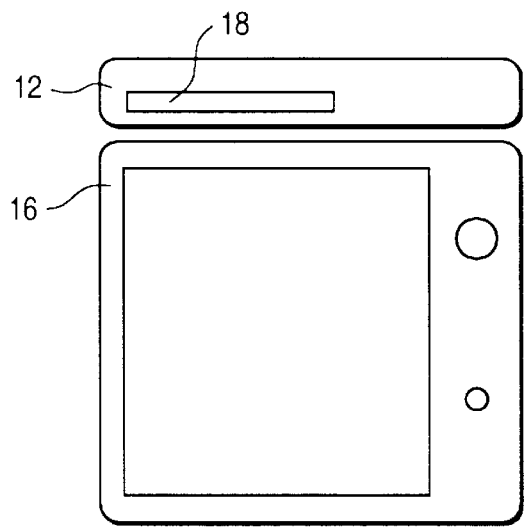
FIG. 1A depicts an exemplary settop unit and television set suitable for implementing the present invention.

The present invention can perhaps be best understood in terms of a viewer with a television set 16 and a settop unit 12 in FIG. 1A and a remote control unit 10 in FIG. 2B.

As shown in FIG. 1A, the settop unit 12 is coupled to a broadcast medium (not shown) and to a broadcast signal input of a television set 16. The settop unit 12 operates to select a particular channel to be received and to display the programming of that channel through the television set 16. The settop unit 12 preferably includes an IR receiver 18 operative to receive remote control signals from a remote control unit. Thus a viewer may select a particular channel to be received by the commanding settop unit 12 via remote control or by operating controls (not shown) on the settop unit 12. The settop unit 12 has circuitry to allow it to generate its own displays to show on the screen of the television 16 and to extract electronic program guide (EPG) information from externally received signals and storing the signals in an internal memory (not shown). Such electronic program guide information signals are sent over any broadcast bands, such as present UHF band, television cable and direct satellite broadcasts.

Figure 1B:
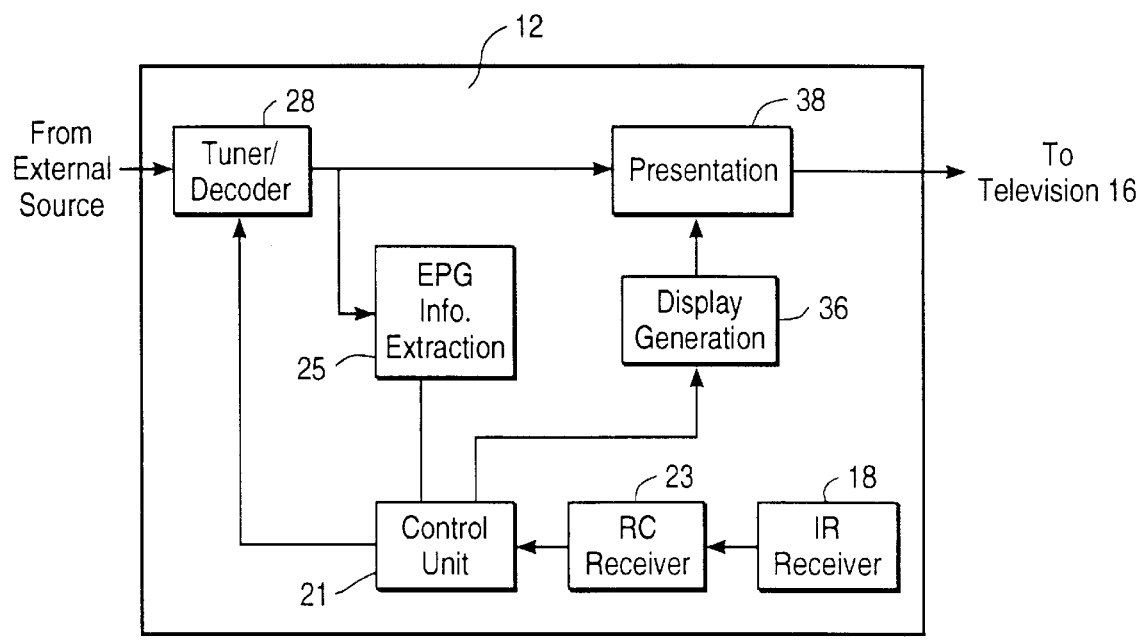
FIG. 1B illustrates the general operation and organization of the internal circuitry of the settop unit of FIG. 1A.

FIG. 1B represents the general operation and organization of the internal circuitry of the settop unit 12. The settop unit 12 includes a tuner/decoder 28, a control unit 21, a remote control receiver 23, an electronic program guide information extraction unit 25, a display generation unit 36, and a presentation circuit 38. The remote control receiver 23 is coupled to the IR receiver 18 and converts the received IR signals to electrical command signals which are input to the control unit 21. The control unit 21 coordinates the general operation of the settop unit 12. The control unit 21 preferably incorporates a microprocessor or microcontroller. One function of the control unit 21 is to generate a channel selection control signal to the tuner/decoder 28. The tuner/decoder 28 receives the external broadcast video signal and isolates a desired channel in accordance with the channel selection control signal.

The program guide extraction unit 25 isolates the EPG information from the received signal. In one embodiment, this information is extracted from the blanking intervals of the currently selected channel. There are, of course, other ways that the EPG information could be multiplexed with video information to display. In an alternative embodiment, the tuner/decoder 28 may be shifted to a special electronic program guide information channel which transmits only EPG information.

The control unit 21 also directs the display generation unit 36 to generate electronic program displays and prompts responsive to the EPG information made available by the electronic program guide extraction unit 25 and further responsive to user commands received via the remote control receiver 23. The control unit 21 also directs the display generation unit 36 to generate various displays and prompts, such as the icons described below, indicative of various functions. The functions pertinent to the present invention are described below. Electronic memory space is also included in the control unit 21 to hold various electrical signals in response to user commands and to guide the control unit 21 through its operations.

The presentation unit 36 combines the program guide display generated by the display generation unit 36 with the video signal received from the tuner/decoder 28 to produce a video signal for display. Certain prompts and displays may be superimposed over video programming of the selected channel. Other displays may occupy the entire screen and thus substitute entirely for the selected channel.

Further details of the internal design of settop unit 12 should be apparent to those of skill in the art and is not further discussed herein. Any combination of hardware or software may be used to implement the functions of settop unit 12.

Of course, a separate settop unit is only one possible apparatus for implementing the present invention. For example, part, or all of the settop unit may be located within the television 16 itself or within an interactive television network coupled to the settop unit 12.

Figure 2:
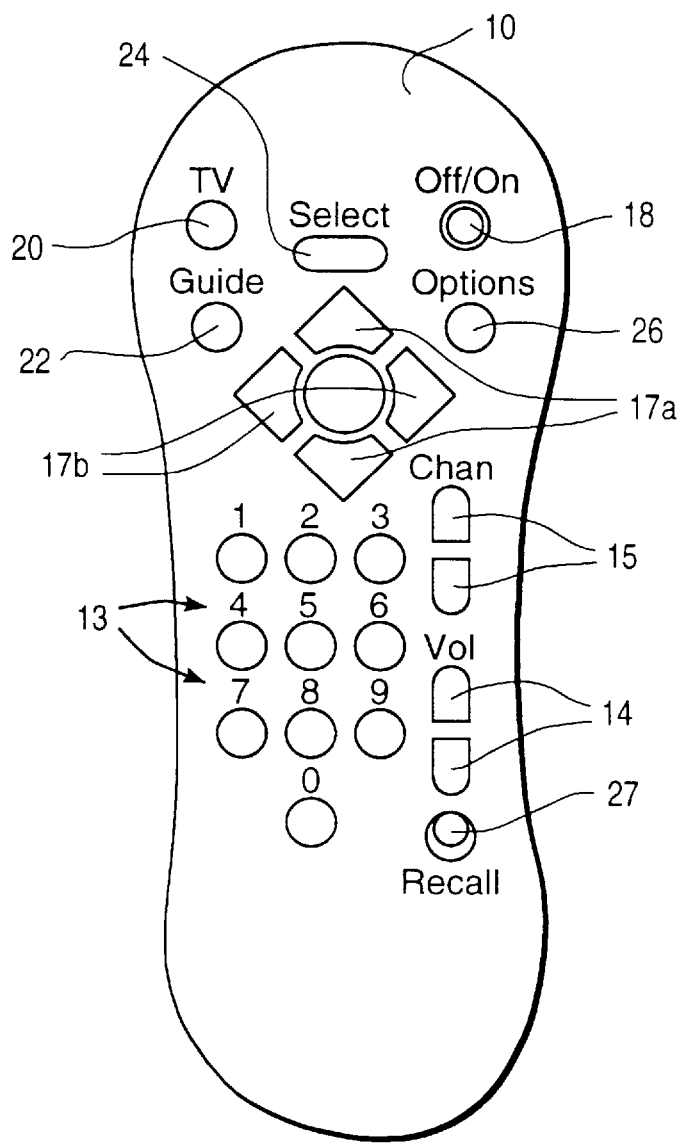
FIG. 2 depicts an exemplary remote control unit suitable for use in conjunction with the settop unit and television set of FIG. 1A.

FIG. 2 depicts the exemplary remote control unit 10 operates with the settop unit 12 and television set 16 in FIG. 1A. Of course, the remote control unit 10 is not drawn to the same scale as the television set 16 of FIG. 1A. The remote control unit 10 includes a numeric keypad 13, volume controls 14, channel controls 15, vertical cursor arrow keys 17A and horizontal cursor arrow keys 17B, an Off/On switch 18, a TV button 20, a Guide button 22, a Select button 24, and an Options button 26. The Off/On switch 18 turns the settop unit 12 on and off. The numeric keypad 13 and/or channel controls 15 are used for channel selection. The volume controls 14 adjust volume of the television set 16. The TV button 20, the Guide button 22, the Select button 24, and the Options button 26 are used in the selection of programs from EPG information signals. An example of such operations are explained in a copending patent application, U.S. application Ser. No. 08/556,624, entitled "ELECTRONIC PROGRAM GUIDE WITH ENHANCED PRESENTATION," filed Nov. 10, 1995 by the present inventor and assigned to the present assignee, which application is incorporated by reference.

In accordance with the present invention, at any time while watching the television set 16, the viewer can "bookmark" programs or channels to which he or she wants to return quickly and/or at a later time. In the simplest form, the present invention operates like the "Recall" feature on many television sets today, which allows a viewer to toggle between the two most recently visited channels. In the present invention up to 32 channels (and programs), for example, may be marked and recalled. This allows the viewer to create a list of favorite channels to flip through when a viewing decision has not yet been made, or allows the viewer to track progress of certain programs while also watching something else.

Figure 3A:
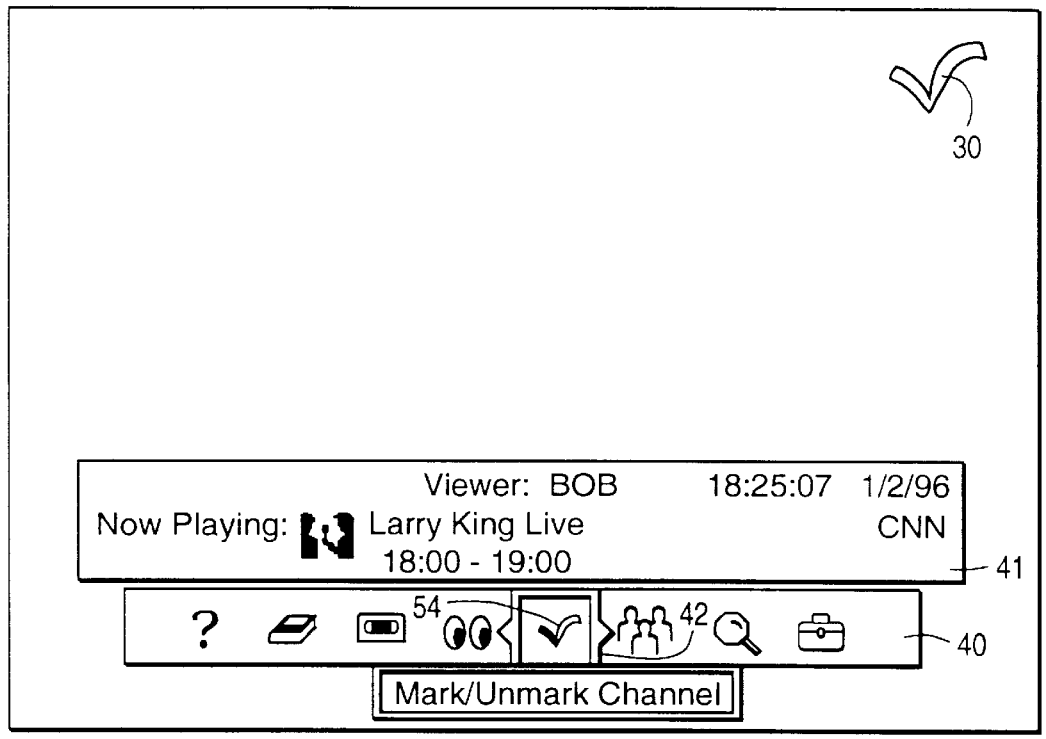
FIGS. 3A–3B depicts a television display showing program and channel bookmarking icons respectively.

The Bookmark feature toggles between three stages: Mark Program, Mark Channel and Unmark. When the viewer is watching an unmarked program which the viewer wishes to "bookmark", the viewer simply presses the Select button 24 on the remote control unit 10. A hollow checkmark icon 30 at the top right of the screen as shown in FIG. 3A, which indicates that the current program is marked. Of course, other icons may be used. To avoid visual confusion the underlying broadcast images are not shown in FIGS. 3A and 3B. This bookmark is remembered only as long as the program is running. When the program ends, the bookmark is automatically removed.

Figure 3B:
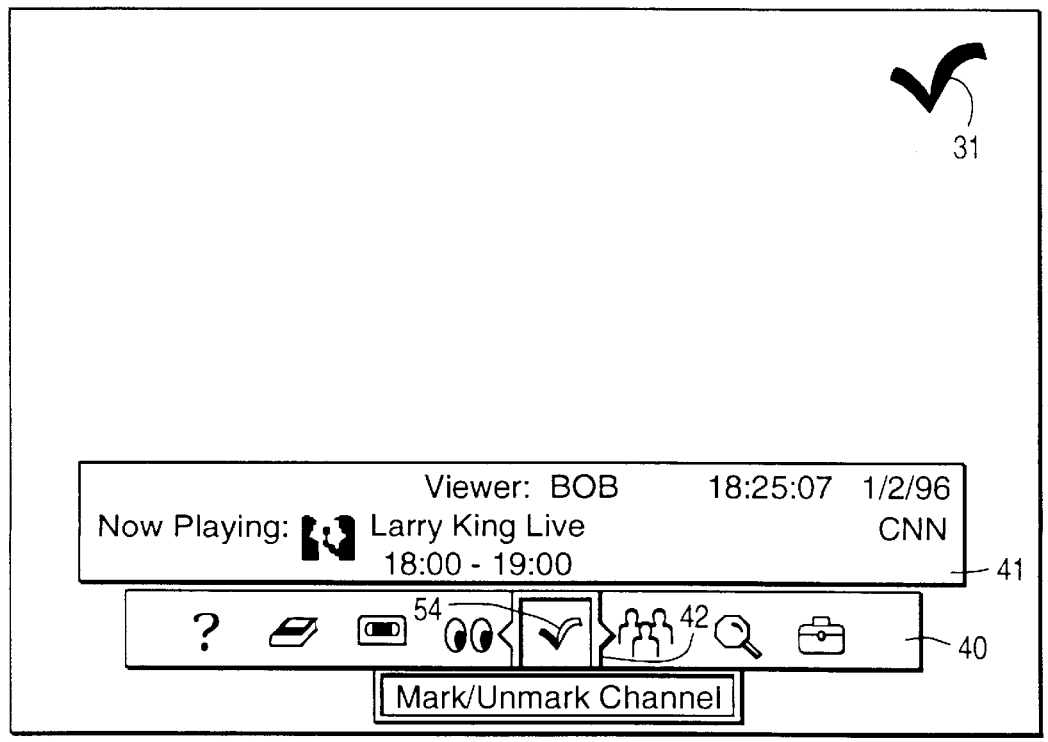

If Select button 24 is pressed again on a marked program, the hollow checkmark changes to a filled checkmark icon as shown in FIG. 3B, which indicates that the channel, rather than the program, is marked. Again, other icons may be used to indicate this function. Marked channels are remembered permanently for the current viewer even after the current viewing session terminates or after the television is turned off, until the viewer removes the bookmark.

If the viewer presses Select button 24 again, the channel bookmark icon 31 is removed and the icon disappears. As the user switches channels, the bookmark icon 30 or 31 is displayed only for a few seconds so as not to interfere with the broadcast image on the television set 16.

Signals to recall bookmarked programs and channels are stored in the settop unit 12. The bookmarked programs and channels are remembered even when the television set 16 is turned off. However, as stated above, marked programs are removed when these programs are over, as indicated by EPG signals being received by the settop unit 12.

The viewer can then sequentially flip through the bookmarked programs and channels, at any point in time during normal viewing, by using the Recall button 27 on the remote control unit 10. The viewer can still navigate through all the channels in order by using Channel Up and Channel Down buttons 15. If no programs or channels have been marked, the last channel visited is recalled by the settop unit 12 so that the television set 16 toggles between the last two visited channels when the viewer presses the Recall button 27 repeatedly.

Figure 4A:
FIGS. 4A–4K depicts television display images of exemplary programs and channels as a viewer bookmarks programs and channels in accordance with an embodiment of the present invention.
Figure 4B:
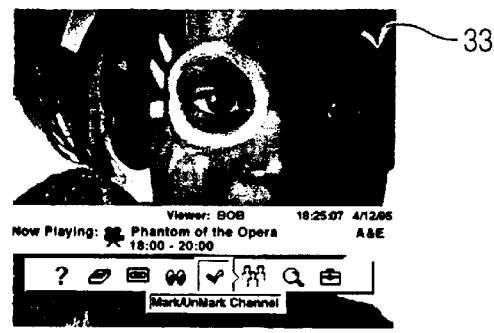
Figure 4C:
Figure 4D:
Figure 4E:
Figure 4F:
Figure 4G:
Figure 4H:
Figure 4I:
Figure 4J:
Figure 4K:

FIGS. 4A–4K illustrate the present invention as might be used by the viewer. Each figure illustrates an exemplary broadcast image on the television set 16 as the viewer bookmarks programs and channels. FIG. 4A shows the image of the first channel. In FIG. 4B the Select button 24 has been pushed twice and the channel has been bookmarked. This is indicated by the shaded icon 33 in the upper righthand corner of the television set 16. The channel is then changed by the different image in FIG. 4C. FIG. 4D indicates that the viewer has changed the channel again. Likewise, FIG. 4E indicates another channel. The viewer then bookmarks the broadcast program by pressing the Select button 24 once. FIG. 4F shows the bookmarked program icon 34 in the upper righthand corner of the image. FIGS. 4G and 4H indicate that the viewer has changed channels twice. A shaded bookmarked channel icon 35 in FIG. 4I indicates that the viewer has pushed the Select button 24 twice to select the channel shown by FIG. 4H. The viewer then changes channels twice as shown by FIGS. 4J and 4K.

Figure 5A:
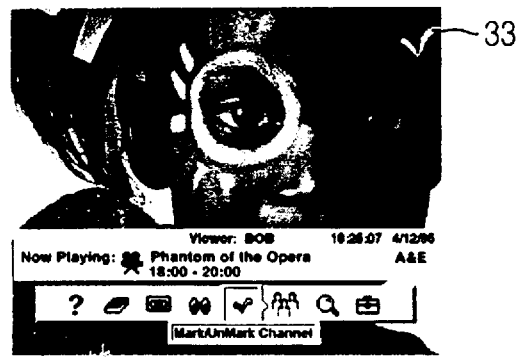
FIGS. 5A–5C depicts recalled television display images of the bookmarked programs and channels of FIGS. 4A–4K.
Figure 5B:
Figure 5C:
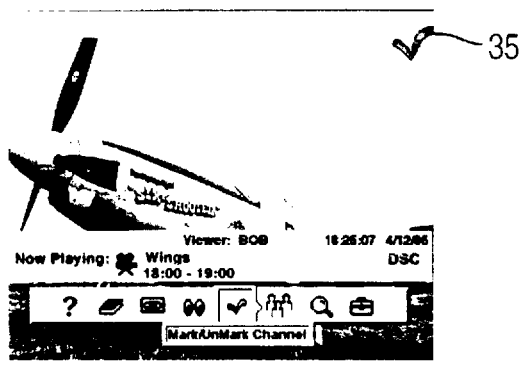

The result is that, after changing among eight channels, the viewer has bookmarked two channels and one program. Upon pushing the Recall button 27, the settop unit 12 recalls the first bookmarked channel, as shown in FIG. 5A. Another push of the Recall button 27 brings the bookmarked program, as shown in FIG. 5B. A third push of the Recall button 27 brings the second bookmarked channel, as shown in FIG. 5C. As noted previously, the bookmarked program of FIG. 5B is recalled only if it is still being broadcast. If the program has ended by the time the viewer pushes the Recall button 27, the settop unit 12 recalls only the bookmarked channels.

It should be noted all of the television set images in the drawings have information on the television set 16. As described above, the bookmarking of programs and channels and their recall can be performed while the settop unit 12 is in a simple broadcast reception mode. The screen of the television set 16 simply displays the broadcast image of the selected channel (and the transient program and channel bookmark icons). The bookmarking of programs and channels and their recall can also be performed in other modes as well.

In the drawings of FIGS. 3A–3B, 4A–4K and 5A–5C, the settop unit 12 is in an EPG display mode by which electronic program guide information may be obtained and displayed on the television set 16. In this mode an icon bar 40 and some electronic program guide information 41 is displayed. See FIGS. 3A and 3B, for example. In this mode and other EPG display modes, which are described in detail in the above-referenced patent application, the viewer can view the schedules of broadcast programs and programs can also be selected for present and future viewing.

As one aspect of the present invention, the viewer can also bookmark programs and channels while in these EPG display modes by selecting these programs from the EPG information. The programs may be broadcast in the future or at the time of the selection. Bookmarking a program is performed by moving an icon cursor 42 on the icon bar 40 over a Mark/Unmark icon 54. Pushing the Select button 24 then bookmarks the selected program for later recall (until the time for program's broadcast has expired).

Figure 6A:
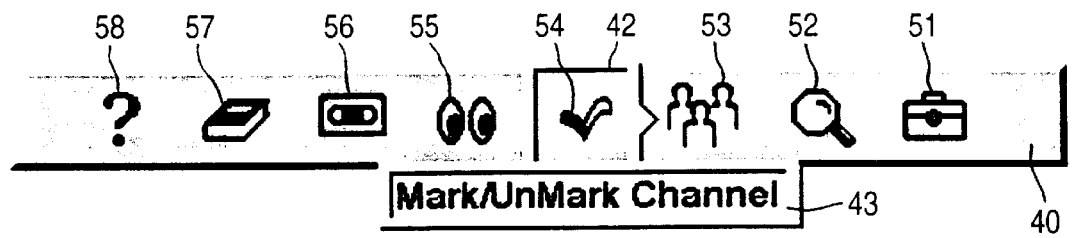
FIGS. 6A–6D illustrates the details and operation of an icon bar displayed in accordance with the present invention.
Figure 6B:
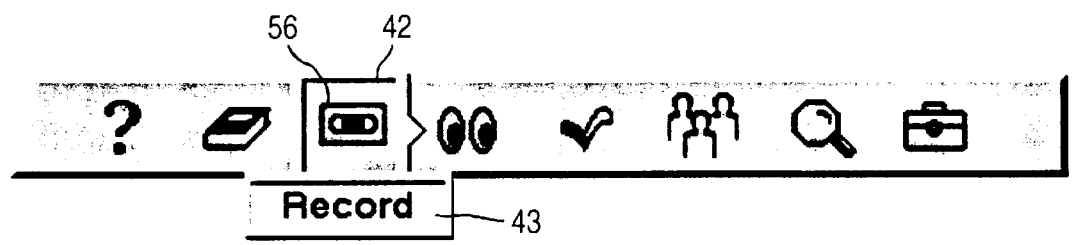
Figure 6C:
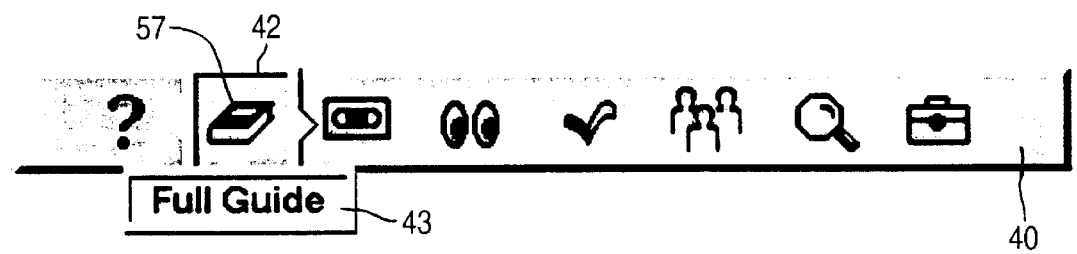
Figure 6D:
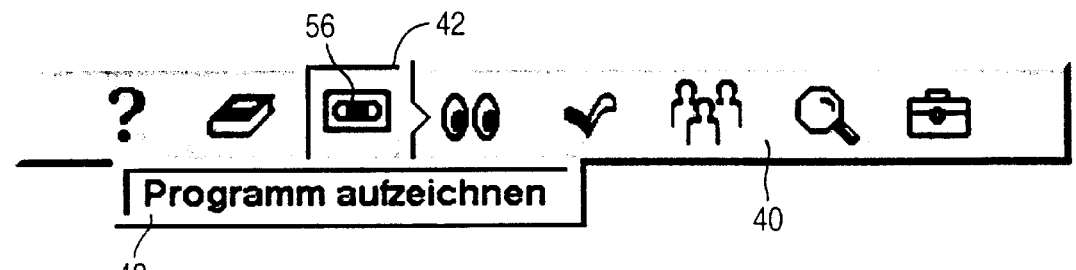

As part of the present invention, the settop unit 12 generates icon bars for display on the television set 16 upon request by the viewer. An icon bar consists of a row of icons identifying functions that the viewer can perform in the context they are in. The viewer uses the ←and→arrow buttons 17B on the remote control unit 10 to move the icon cursor box 42 from one icon to the next. A function is chosen by pressing the Select button 24 on the remote control unit 10 when the icon cursor box 42 is over the selected function. In the example shown in FIGS. 6A–6C, the icon bar 40 has icons 51–58, which include the Mark/Unmark icon 54. In the three drawings the icon cursor 42 is moved to the left by pushing the left arrow button 17B.

The number of icons available are not limited to the size of the screen. The viewer may access more of the icons by moving the icon cursor box 42 to the far left or right of an icon bar. The icon cursor box 42 shows the viewer the appropriate left and right arrows when they are available. In addition, a partial icon is visible on the end of the bar to reinforce the fact that more functions lie in that direction. If there are no more icons to the left, for example, the icon cursor box 42 shows only a right arrow.

As shown in FIGS. 6A–6D, the icon cursor box 42 is accompanied by a text bar 43 which describes the function of the icon on which icon cursor box 42 is placed. By providing text for only the icon the cursor is on, more choices can be provided than that by textual menus in the same amount of screen space. At the same time, the text bar 43 provides for a large text space for international translation of each function of the icon. The example shown in FIG. 5D shows a German phrase for a Record.

The use of icon bars, the icon cursor and the accompanying allow the viewer to easily create lists of identifiable viewers. For example, the icon bar 40 shown in FIG. 6A has a Viewer icon 53 which leads to further icon bars to identify the viewer from a list of viewer or to add a viewer. In the electronic program guide information 41 shown in FIGS. 3A and 3B, for example, the viewer, "Bob," is identified. Once an "Add Viewer" function is selected, the arrow buttons 17A and 17B and the Select button 24 allow the name of the added viewer to be entered from an on-screen table of letters.

In accordance with the present invention, there is a separate list of bookmarked programs and channels for each identified viewer. Upon identifying himself or herself to the settop unit 12 through the remote control unit 10 as prompted by the displays on the television set 16, the viewer has personalized programs and channels which are bookmarked. Accordingly, each viewer need not waste time to flip through channels and programs which are undesirable to that viewer.

While the above is a complete description of the preferred embodiments of the invention, various alternatives, modifications and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. An apparatus coupled to broadcast signals and a television set for displaying broadcast programs and channels on a screen of said television set, said apparatus comprising means for displaying broadcast programs on selected channels to a viewer;

means for marking one or more of said programs in response to a first signal from said viewer;

means for marking one or more of said channels in response to a second signal from said viewer;

means for storing signals corresponding to said marked programs and channels; and means for sequentially displaying said marked programs and said channels in response to a third signal from said viewer.

2. The apparatus of claim 1 wherein said apparatus is further coupled to broadcast electronic program guide information signals and wherein said storing means removes the signals corresponding to a marked program responsive to said broadcast electronic program guide information signals indicative of a termination of said marked program.

3. The apparatus of claim 1 further comprising means for displaying an icon on said screen in response to said program marking means marking a program.

4. The apparatus of claim 1 further comprising means for displaying an icon on said screen in response to said channel marking means marking a channel.

5. The apparatus of claim 1 further comprising means for unmarking a marked program or a marked channel in response to a fourth signal from said viewer.

6. The apparatus of claim 5 further comprising a remote control unit associated with said viewer, said remote control unit having a first button and generating the first, second, or fourth signals as said first button is asserted sequentially.

7. A method for displaying broadcast programs and channels on a television screen, said method comprising the steps of:

displaying on said television screen broadcast programs on selected channels to a television viewer;

marking one or more of said programs in response to a first signal from said television viewer;

marking one or more of said channels in response to a second signal from said television viewer;

storing signals corresponding to said marked programs and channels; and sequentially displaying said marked programs and channels on said television screen in response to a third signal from said television viewer.

8. The method of claim 7 wherein said storing step further comprises removing the signals corresponding to a marked program responsive to broadcast electronic program guide information signals indicative of a termination of said program.

9. The method of claim 7 wherein said program marking step further comprises displaying an icon.

10. The method of claim 7 wherein said channel marking step further comprises displaying an icon.

11. The method of claim 7 further comprising the step of unmarking a marked program or a marked channel in response to a fourth signal from said viewer.

\* \* \* \* \*